R. B. & J. R. Parks,

Stalk Cutter.

No. 3673. Reissued Oct. 12. 1869.

Witnesses:
E. Wolff
Wm. A. Morgan

Inventors:
R. B. Parks
&
J. R. Parks
by Munn & Co. Attys.

N. PETERS, PHOTO-LITHOGRAPHER, WASHINGTON, D. C.

United States Patent Office.

R. B. PARKS AND J. R. PARKS, OF NEPONSET, ILLINOIS.

*Letters Patent No.* 85,847, *dated January* 12, 1869; *reissue No.* 3,673, *dated October* 12, 1869.

IMPROVEMENT IN STALK-CUTTERS.

The Schedule referred to in these Letters Patent and making part of the same.

*To all whom it may concern:*

Be it known that we, R. B. PARKS and J. R. PARKS, of Neponset, in the county of Bureau, and State of Illinois, haved invented a new and improved Stalk-Cutter; and we do hereby declare that the following is a full, clear, and exact description thereof, reference being had to the accompanying drawings, and letters marked thereon, making a part of this specification, in which—

Figure 1:
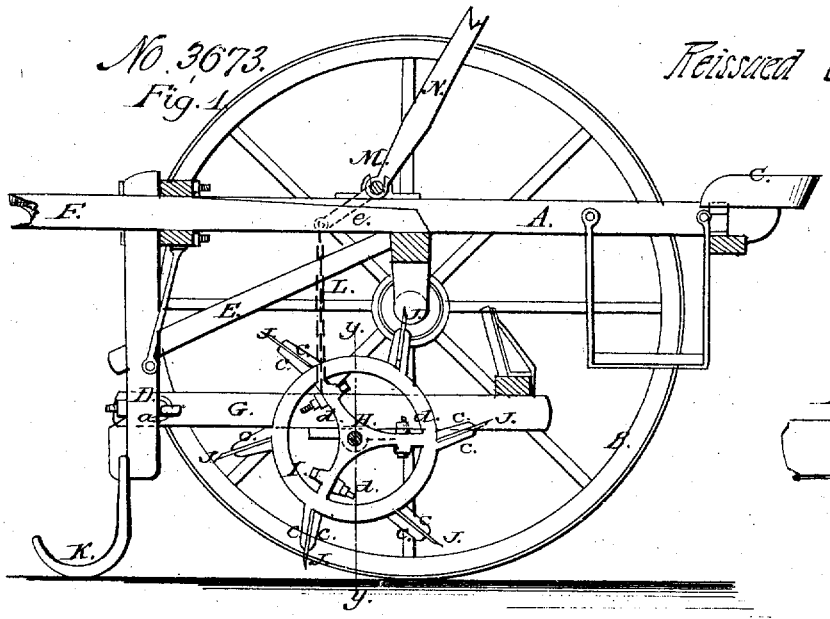
Figure 2:
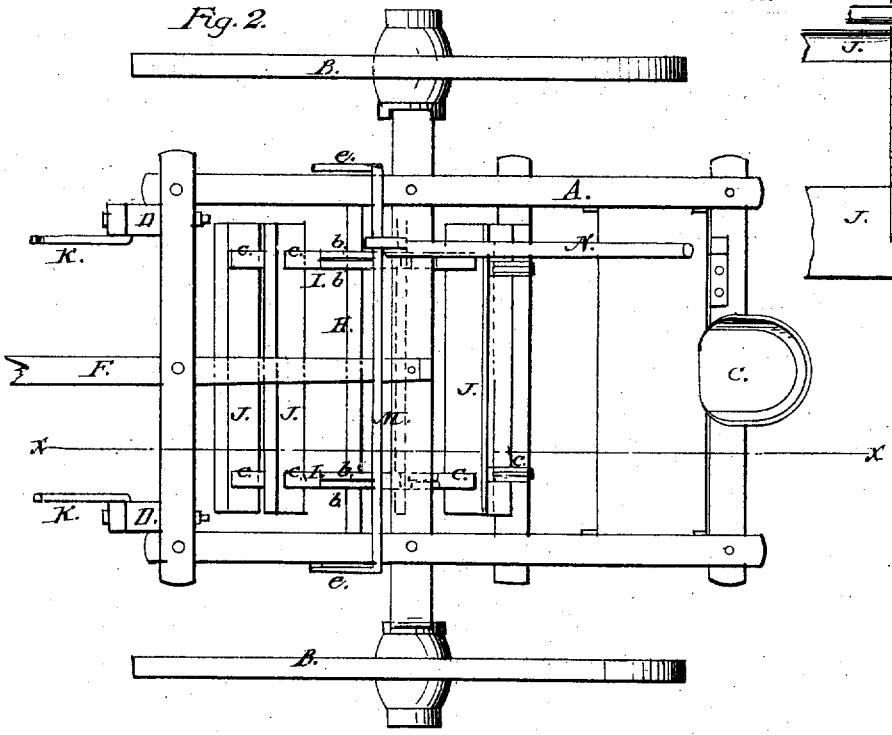

Figure 1 is a side sectional view of our invention, taken on the line *x x*, fig. 2.

Figure 2, a plan or top view of the same.

Figure 3:
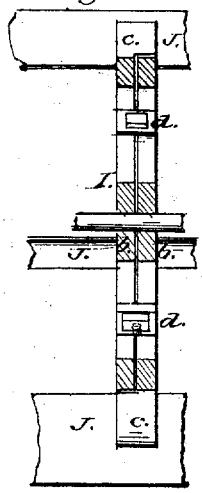

Figure 3, an enlarged section pertaining to the same, taken on line *y y*, fig. 1.

The present invention relates to a new and improved machine for cutting the standing stalks of Indian corn or maize into short lengths, that they may be left on the ground and plowed under, and cause no difficulty or trouble in the cultivation of succeeding crops.

A represents a rectangular frame, which is mounted on two wheels, B B; has a driver's seat, C, on its rear part, and two pendants, D D, secured to its front part, and firmly braced by bars, E E.

F is a part of the draught-pole, which is attached in any proper manner to the front part of the machine.

G is a rectangular frame, which is made smaller than the frame A, and it is connected, by joints *a*, to the pendants D D, so that said frame G may rise and fall, or work from the joints *a*, as catches.

This frame G supports a transverse shaft, H, on which two cast-iron circular heads, I I, are keyed fast.

These heads are each composed of two parts, *b b'*, which are precisely alike in form, except that the arms *c*, in front of the knives K, are somewhat the shorter, as shown at fig. 1.

Each part *b* is provided with six of these arms, *c*, and between the arms *c*, of the parts *b b*, of each head, knives, J, are secured by means of bolts, *d*, which pass through the spokes of the heads.

In order to prevent the casual dropping out of the knives from between the arms *c*, when the parts *b b* of the heads are not screwed up tightly, the arms *c* of one of the parts *b* of each head, may be provided with pins, to fit into holes in the knives.

The arms *c* have not a radial position with the heads, but are somewhat oblique or inclined, as shown in fig. 1.

The shaft H is allowed to turn freely in its bearings, and, as the machine is drawn along, the knives will rotate, in consequence of coming in contact with the earth, and the standing stalks will be cut into small pieces, so that they may be plowed under without any trouble or difficulty whatever, the cutting of the stalks being facilitated by the angular position of the cutters, which is due to the oblique or angular position of the arms *c*.

The standing stalks, should any be lodged or cast down, are raised by hooks K, which are attached to the lower ends of the pendants D D.

The knives J are made of steel, and their outer edges sharpened by a basil at one side.

The frame G is connected at each side, by chains L L, to arms *e e*, at the end of a shaft, M, which is placed transversely on the frame A.

This shaft M is provided with a lever, N, which extends back within convenient reach of the driver on seat C.

By drawing backward the lever N, the frame G may be raised, and the cutters elevated, so that they will be free from the surface of the ground.

In consequence of having the heads I I, in which the knives J are secured, composed of two parts, *b b*, provided with arms, *c*, and bolts, *d*, the knives may be very firmly held in position, and they cannot become loose unless all the bolts *d* should loosen by the casual unscrewing of the nuts, a contingency not very liable to occur.

Having thus described our invention,

What we claim, and desire to secure by Letters Patent of the United States, is—

1. The heads I I, constructed each of two parts *b b*, provided with arms *c*, and connected by bolts *d*, for the purpose of firmly securing the knives J in position, substantially as herein shown and described.

2. The combination of the heads I, supporting-knives J, frame G, chains L, lever N, and hooks K, all constructed and arranged as described.

R. B. PARKS.
J. R. PARKS.

Witnesses:
L. R. WINN,
J. B. PARKS.